(12) United States Patent
Park

(10) Patent No.: US 6,785,555 B2
(45) Date of Patent: Aug. 31, 2004

(54) APPARATUS FOR DIVIDING POWER AND METHOD THEREOF IN PICO-BASE TRANSCEIVER STATION

(75) Inventor: Jong-Myung Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 478 days.

(21) Appl. No.: 09/750,300

(22) Filed: Dec. 29, 2000

(65) Prior Publication Data

US 2001/0006903 A1 Jul. 5, 2001

(30) Foreign Application Priority Data

Dec. 29, 1999 (KR) ......................................... 1999-65283

(51) Int. Cl.[7] .................... H04B 3/36; H04B 7/14; H04B 1/60; H04Q 7/20; H04M 1/00
(52) U.S. Cl. ................ 455/522; 455/7; 455/9; 455/442
(58) Field of Search ................ 455/522, 11.1, 455/13.4, 444, 561, 562.1, 571, 446, 449, 7, 9, 422.1

(56) References Cited

U.S. PATENT DOCUMENTS

| | | | | |
|---|---|---|---|---|
| 5,561,397 A | * | 10/1996 | Kumar et al. | 330/295 |
| 5,946,622 A | * | 8/1999 | Bojeryd | 455/444 |
| 6,035,218 A | * | 3/2000 | Oh et al. | 455/562.1 |
| 6,374,119 B1 | * | 4/2002 | Jun et al. | 455/523 |
| 6,560,441 B1 | * | 5/2003 | Sabat et al. | 455/14 |

FOREIGN PATENT DOCUMENTS

JP 58-100502 * 6/1983 ............ H01Q/3/26

* cited by examiner

Primary Examiner—Vivian Chin
Assistant Examiner—Yuwen Pan
(74) Attorney, Agent, or Firm—Robert E. Bushnell, Esq.

(57) ABSTRACT

An apparatus and a method for dividing power within a service area serviced by a pico-base transceiver station (Pico-BTS) are disclosed. The apparatus for dividing power in a Pico-BTS includes a repeater for amplifying, by a prescribed degree of amplification, a signal provided by a Pico-BTS main unit, and a power divider for controlling the amplified signal so that it is equally divided within a service area serviced by the Pico-BTS.

12 Claims, 2 Drawing Sheets

APPARATUS FOR DIVIDING POWER AND METHOD THEREOF IN PICO-BASE TRANSCEIVER STATION

CLAIM OF PRIORITY

This application claims priority based on an application entitled APPARATUS FOR DIVIDING POWER AND METHOD THEREOF IN PICO-BASE TRANSCEIVER STATION filed with the Korean Industrial Property Office on Dec. 29, 1999 and assigned Serial No. 1999-65283, the contents of which is hereby incorporated by reference.

BACKGROUND OF THE INVENTION

1. Technical Field

The present invention generally relates to a pico-base transceiver station (Pico-BTS) system and, in particular, to an apparatus for dividing power and a method thereof within a service area serviced by a Pico-BTS.

2. Related Art

In general, a mobile communications system divides a service available area into cells to provide communication services. Examples of the cells include a macro cell, a micro cell, and a pico cell. The cells are arranged within a specific area to efficiently provide a differential service area. The macro cell provides the widest service area, while the micro cell provides the narrowest service area.

The pico cell is used to provide call services within buildings, specific areas such as campuses, playgrounds, airports, and shopping malls, areas where a special event or a natural disaster happens, and areas where remote-control is impossible. The pico cell is also used to complement call services of the macro cell or a mini cell having a tunnel, and to improve service quality in areas where service quality is poor.

A Pico-BTS provides communication services for the pico cell. The Pico-BTS includes a pico-main unit and a pico-radio unit. However, since the pico-radio unit is expensive, the total production cost increases. In this respect, services through the pico-main unit and a repeater have been suggested.

However, services provided through a pico-main unit have also experienced production cost problems due to the necessity of providing additional equipment (i.e., amplification equipment) when there is a large distance between the repeater and the areas to be serviced.

SUMMARY OF THE INVENTION

Accordingly, the present invention is directed to an apparatus for dividing power and a method thereof in a Pico-BTS that substantially obviate one or more of the problems resulting from limitations and disadvantages of the related art.

An object of the present invention is to provide an apparatus for equally dividing power within a service area in a Pico-BTS.

Another object of the present invention is to provide a method for equally dividing power within a service area in a Pico-BTS.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof, as well as in the appended drawings.

To achieve these and other advantages and in accordance with the purpose of the present invention, as embodied and broadly described, an apparatus for dividing power in a Pico-BTS according to the present invention includes a repeater for amplifying a signal, which is of a prescribed size and which is provided displaced from a Pico-BTS main unit, and a power divider for controlling the signal amplified by the repeater to be equally divided into a service area serviced by the Pico-BTS.

In another aspect of the present invention, a method for dividing power in a Pico-BTS having a Pico-BTS main unit and a repeater displaced from the Pico-BTS main unit for amplifying a signal to a prescribed degree includes the steps of controlling the power division rate to equally divide the power into a service area serviced by the Pico-BTS, and power-dividing the amplified signal depending on the controlled power division rate.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, and wherein.

DETAILED DESCRIPTION OF THE PREFERRED EMBODIMENTS

Figure 1:
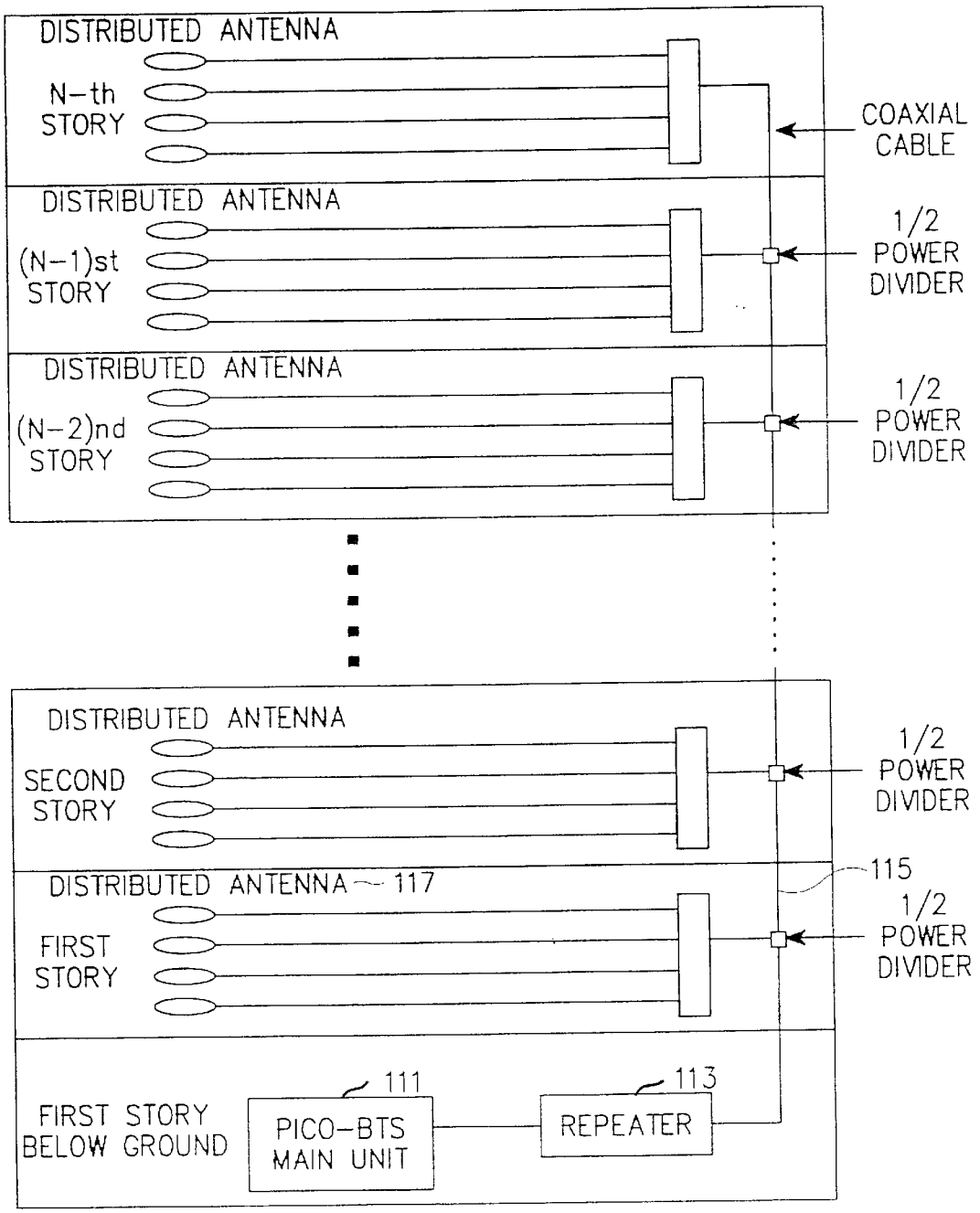
FIG. 1 is a block diagram showing the internal configuration of an apparatus for dividing power in a Pico-BTS.

Reference will now be made in detail to the preferred embodiments of the present invention, examples of which are illustrated in the accompanying drawings.

It is to be understood that like reference numerals refer to like elements in the drawings. Also, in the case where it is determined that the related art or known detailed description unnecessarily makes the subject matter of the present invention unclear, the detailed description will be omitted. Terms are defined by considering functions in the present invention and depend on users, chip designers, or practices. Accordingly, their definition should be made based on the content of the entire specification of this invention.

FIG. 1 is a block diagram showing the internal configuration of an apparatus for dividing power in a Pico-BTS.

First, it is assumed that an area serviced by the Pico-BTS is an N-storied building. In this case, a signal generated from a Pico-BTS main unit (PMU) 111 is provided to a repeater 113, and then is amplified to a prescribed degree. The signal amplified by the repeater 113 is provided through a coaxial cable to a power divider 115 which is mounted in each story. The power divider 115 power-divides the signal amplified by the repeater 113 by one-half, and then provides the resultant signal to the first story. Next, the power divider 115 power-divides the signal previously divided by one-half by another one-half, and provides the resultant signal to the second story. In the case where the signal power-divided in this way is provided to each story, it is impossible to provide an original signal if the distance from the repeater 113 is great, that is, if the size of the power provided to the N-th story is weak. To provide the original signal, an amplifier has been additionally required. For this reason, an increase in cost has been experienced.

Figure 2:
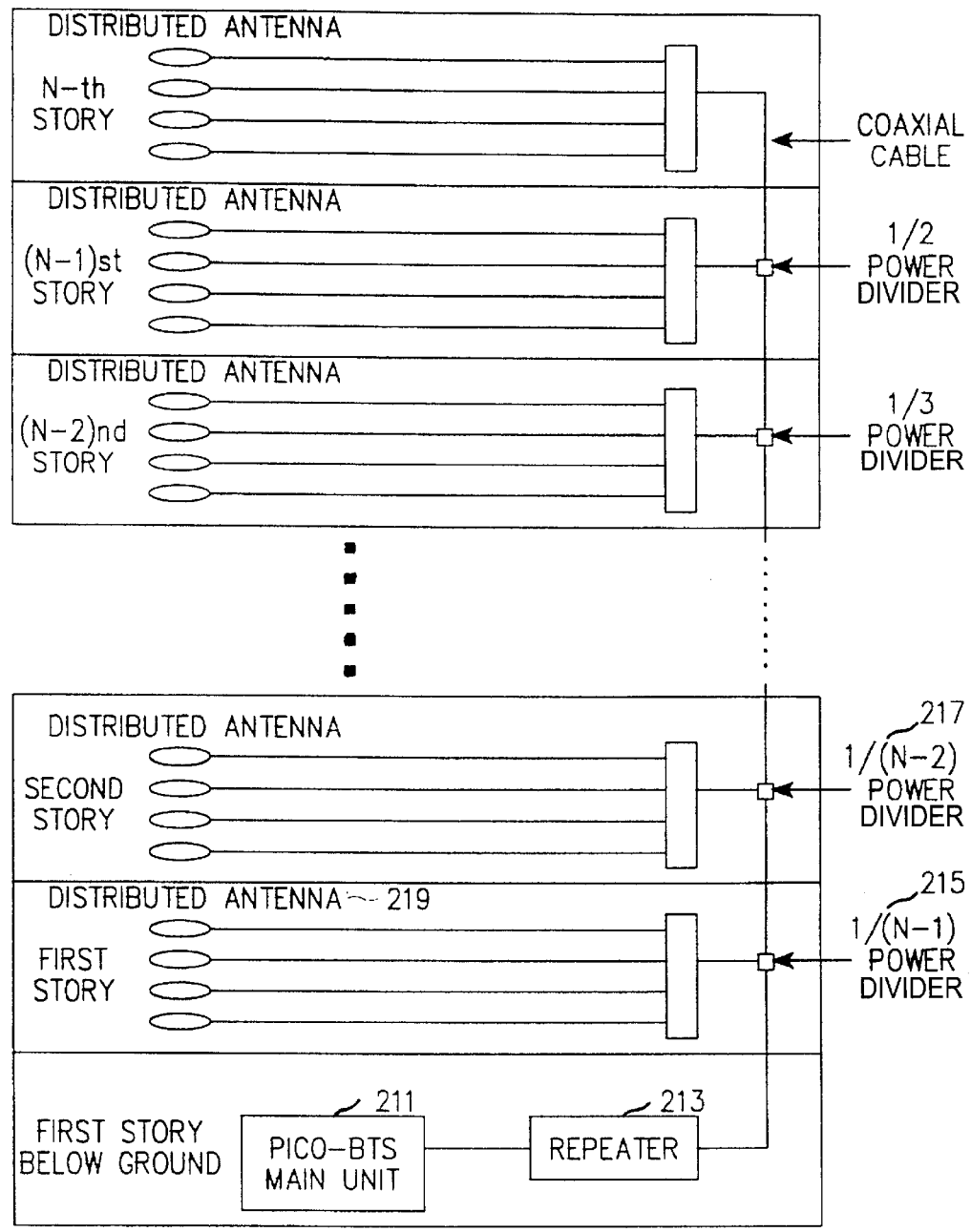
FIG. 2 is a block diagram showing the internal configuration of an apparatus for dividing power in a Pico-BTS according to the present invention.

FIG. 2 is a block diagram showing the internal configuration of an apparatus for dividing power in a Pico-BTS according to the present invention.

First, it is assumed that an area serviced by the Pico-BTS is an N-storied building. In this case, a signal generated by a Pico-BTS Main Unit (PMU) 211 is provided to a repeater 213. The signal is then amplified by a prescribed amount. The signal generated by the PMU 211 is an intermediate frequency (IF) signal, for example, an IF signal having a band of 4.95 MHz. The IF signal is amplified to a degree set by the repeater 213, that is, for a radio signal of 800 MHz which is a standard size for available service. The signal amplified by the repeater 213 is provided through a coaxial cable to a power divider, which is mounted in each story of the building.

A power divider 215 of the first story power-divides the signal amplified by the repeater 213 by 1/N−1, and the amplified signal is provided to the first story. Next, a power divider 217 power-divides the signal previously divided by 1/N−1 by 1/N−2, and then provides it to the second story. In the case where the signal power-divided in this way is provided to each story, the size of the power provided to each story is equal, even as the distance from the repeater 213 increases. Thus, it is possible to minimize power consumption and provide an original signal. This is because the power division rate is controlled so as to be inversely proportional to the distance from the repeater 213.

Furthermore, a distributed antenna 219 is mounted in each story. The distributed antenna 219 is mounted in a place, such as a window, where interference from an external BTS is minimized, the greatest interference signal generated from the external BTS occurring in the window of the building.

As previously mentioned, the apparatus for dividing power and the method thereof in a Pico-BTS, according to the present invention, have the following advantage.

Since the power division rate is controlled within the service area serviced by the Pico-BTS so as to equally divide the power, it is possible to provide equal quality of service, regardless of the distance from the PMU.

While the present invention has been described and illustrated herein with reference to the preferred embodiments thereof, it will be apparent to those skilled in the art that various modifications and variations can be made therein without departing from the spirit and scope of the invention. Thus, it is intended that the present invention cover the modifications and variations of this invention that come within the scope of the appended claims and their equivalents.

What is claimed is:

1. An apparatus for dividing power in a pico-base transceiver station (Pico-BTS), comprising:
    a repeater for amplifying, to a prescribed degree of amplification, a signal provided by a Pico-BTS main unit; and
    a power divider for controlling the signal amplified by the repeater so that the signal is equally divided within a service area serviced by the Pico-BTS and a power division rate of the signal is inversely proportional to a distance from the repeater to a point at which the power-dividing takes place.

2. The apparatus of claim 1, further comprising a distributed antenna connected to the power divider for receiving a radio signal.

3. The apparatus of claim 2, wherein the distributed antenna is mounted in a place where interference from an external base transceiver station (BTS), not the Pico-BTS, is minimized.

4. The apparatus of claim 1, wherein the Pico-BTS main unit generates an intermediate frequency, and the repeater amplifies the intermediate frequency generated by the Pico-BTS main unit at a standard frequency for available service.

5. The apparatus of claim 1, wherein said power divider comprises a plurality of power dividers, and wherein a first power divider divides a signal by 1/(N−1), and a second power divider divides a signal by 1/(N−2), wherein N is a total number of stories of a building.

6. A method for dividing power in a Pico-BTS provided with a Pico-BTS main unit and a repeater for amplifying a signal to a predetermined degree of amplification, said repeater being displaced from the Pico-BTS main unit, the method comprising the steps of:
    controlling a power division rate so as to equally divide the power within a service area serviced by the Pico-BTS; and
    power-dividing the amplified signal depending on the controlled power division rate which is inversely proportional to a distance from the repeater to a point at which the power-dividing takes place.

7. An apparatus for dividing power in pico-base transceiver station (Pico-BTS), comprising:
    repeater means for receiving a signal provided by a Pico-BTS main unit and for amplifying the received signal to a prescribed degree of amplification; and
    power divider means for controlling the amplified signal so that it is equally divided within a service area serviced by the Pico-BTS and a power division rate of the signal is inversely proportional to a distance from the repeater to a point at which the power-dividing takes place.

8. The apparatus of claim 7, said apparatus further comprising distributed antenna means connected to the power divider means for receiving a radio signal.

9. The apparatus of claim 8, wherein the distributed antenna means is mounted in a place where interference from an external base transceiver station (BTS), not the Pico-BTS, is minimized.

10. The apparatus of claim 7, wherein the Pico-BTS main unit generates an intermediate frequency (IF) signal, and the repeater means amplifies the IF signal at a standard frequency for available service.

11. The apparatus of claim 7, wherein said power divider means comprises a plurality of power dividers, and wherein a first power divider means divides a signal by 1/(N−2), and a second power divider means divides a signal by 1/(N−1), wherein N is a total number of stories of a building.

12. A method for dividing power in a Pico-BTS, comprising the steps of:
    providing a Pico-BTS main unit and a repeater for amplifying a signal provided by the Pico-BTS main unit to a prescribed degree of amplification;
    controlling a power division rate so as to equally divide the power within a service area serviced by the Pico-BTS; and
    power-dividing the amplified signal depending on the controlled power division rate which is inversely proportional to a distance from the repeater to a point at which the power-dividing takes place.

* * * * *